Patented July 6, 1926.

1,591,900

UNITED STATES PATENT OFFICE.

MARK WALKER, OF LOS ANGELES, CALIFORNIA, ASSIGNOR TO THE PACIFIC R. & H. CHEMICAL CORPORATION, OF EL MONTE, CALIFORNIA, A CORPORATION OF CALIFORNIA.

STABILIZATION OF LIQUID HYDROCYANIC ACID.

No Drawing. Original application filed April 16, 1924, Serial No. 706,883. Divided and this application filed August 4, 1925. Serial No. 48,056.

This invention relates to stabilizing liquid hydrocyanic acid, and has for its object to preserve or stabilize this material against decomposition or polymerization or both. This application is a division of my application Serial Number 706,883 filed April 16, 1924, under the title stabilization of liquid hydrocyanic acid.

Liquid hydrocyanic acid is a water-white liquid of very loy viscosity and density, boiling at about 26.5° C. When put in storage without treatment, it changes color after a few days, passing through the various shades from faint amber to dark opaque brown, finally becoming solid with release of gaseous by-products, including ammonia. This action is considered to be substantially a polymerization and is thought to be promoted by alkalis and restrained by acids. Alkalis, particularly metal alkalis may be present in the liquid acid as an impurity, and any ammonia in the acid of course, has the effect of an alkali. The nature of the solid end product is not thoroughly understood. This decomposition reaction is exothermic and hence when once started tends to accelerate unless the rate of heat radiation exceeds that of generation. Since there is usually a low heat radiation from the container, it frequently happens that sealed vessels containing liquid hydrocyanic acid become so hot that the liquid may vaporize. The liberation of ammonia and the increase of temperature and of pressure also accelerate the reaction, so that it is self-accelerating in cumulative manner. Severe explosions have occured, which are dangerous to life because of the highly toxic hydrocyanic acid gas evolved.

I have found that internal pressures of over 1,000 pounds per square inch can be developed within a few seconds after the reaction once begins to accelerate.

Manufacturers of liquid hydrocyanic acid have heretofore used small amounts of acids, such as sulphuric, as stabilizers, which have been partially effective in prolonging the period of stability from a few days or weeks to as long as one or two years, under favorable conditions. However, when vessels are closed to be gas tight the liquid may heat up above its boiling point thus generating pressure favorable to formation of decomposition products, notwithstanding the presence of the stabilizing acid. Hence, simple acid stabilizers cannot be depended upon to preserve all containers of liquid hydrocyanic acid under conditions prevailing with common carriers and warehouses.

It is believed that acids act as stabilizers by neutralizing alkaline materials, and thus to the extent to which such neutralization is effected, checking their tendency to promote the decomposition and polymerization. It is further found that acids may promote either molecular reactions or rearrangements or both, particularly in the presence of water. My investigations have led me to conclude that while acids temporarily restrain, they slowly but surely produce chemical changes that tend to promote the undesirable decomposition and polymerization. For example, I have found that a small amount of sulphuric acid, say, .05%, is a better stabilizer than a considerably larger amount, such as 5%. I have concluded that the stabilizing acid ordinarily added functions to restrain the unfavorable action of metallic alkalis, probably by neutralization, but does not prevent the trouble due to basic nitrogen compounds, of which ammonia is the best example. Theoretically, such ammonia compounds can be formed in large amounts after the metallic alkalis are permanently neutralized. It seems to me possible that upon standing, a small amount of acid stabilizer will be neutralized by slowly forming nitrogen alkalis to the point where the free acid is exhausted, and thereupon continued formation of nitrogen alkalis quickly and surely promotes the undesirable decomposition and polymerization.

I have discovered that certain metals or compounds thereof put in the liquid hydrocyanic acid will give a better stabilizing effect than any acids with which I am familiar. This stabilizing effect is better because permitting storage for months at temperature as high as 50° C., and at corresponding pressures, without decomposition or polymerization.

Metals which form complexes with ammonia and other nitrogen bases are suitable, such metals being copper, nickel, cobalt and Monel metal, among others, but they do not have to be appreciably soluble in the liquid hydrocyanic acid.

My preferred process is to slightly acidify the liquid hydrocyanic acid, as with .005% by weight of sulphuric acid. This proportion may be increased to several percent and its purpose is to neutralize all metallic alkalis or compounds as well as nitrogen alkalis or compounds, I then introduce into the container a suitably sized roll of copper or other metal gauze which exposes a sufficient surface so that solution of the metal may take place to the point of equilibrium. Copper is most convenient because it dissolves to an appreciable extent in liquid hydrocyanic acid and is in this respect somewhat better than nickel or monel metal, which may also be used. The contact of the liquid hydrocyanic acid with the metal continually removes whatever nitrogen alkali may be formed in the solution, thereby imparting greatly increased stability.

I do not restrict myself to copper, nickel, cobalt or monel metal, since other metals than copper, nickel or monel metal may be used, and they may be used as couples, or alloys, or as pure mixed powders, or in sheets or gauzes. The lining of the container may perform this function and be partly or wholly replaceable therefor, as forms or construction and convenience may indicate. The best results are obtained with large exposed metal surface, because of reduced time factor. Hence a metal powder will be very efficacious.

Although I have above given what seem to me to be the best reasons for the stabilizing action of metals in liquid hydrocyanic acid, I do not restrict myself thereto as the decomposing and polymerization reactions are complex and the explanation given does not cover all details thereof.

However, I have demonstrated conclusively for a long period by many experiments that copper particularly, nickel, cobalt and monel metal to a less extent and other metals, have such a marked effect in stabilizing liquid hydrocyanic acid as to enable it to be safely stored for much longer periods than has heretofore been possible, and under higher temperatures and pressures, without decomposition or polymerization. Test samples stabilized with copper have successfully stood in excess of 630 days under temperature and pressure conditions in excess of any ever met with in common carriers and storehouses.

As I believe I am the first to accomplish this result I do not restrict myself to any precise method or material but intend to claim my invention broadly.

Whenever in the specification and claims I refer to liquid hydrocyanic acid, I mean either chemically pure or a commercial product, and either hydrous or anhydrous.

What I claim is:

1. The process of stabilizing liquid hydrocyanic acid which consists in combining decomposition nitrogen alkali products with nickel.

2. The process of stabilizing liquid hydrocyanic acid which consists in contacting it with nickel.

3. The process of stabilizing liquid hydrocyanic acid which consists in contacting it with nickel in the presence of an agent capable of reacting with an neutralizing any alkaline substances in the liquid hydrocyanic acid.

4. The process of stabilizing liquid hydrocyanic acid which consists in contacting it with nickel in the presence of an acid which is more capable of reacting with alkalies in the hydrocyanic acid than hydrocyanic acid itself and is incapable of reacting with hydrocyanic acid.

5. The process of stabilizing liquid hydrocyanic acid which consists in contacting it with nickel in the presence of sulphuric acid.

6. As a new article of manufacture, liquid hydrocyanic acid containing nickel.

7. As a new article of manufacture, liquid hydrocyanic acid treated with sulphuric acid and nickel.

8. A process of stabilizing liquid hydrocyanic acid which consists in contacting it with nickel which forms an integral part of the inner walls of the hydrocyanic acid containing vessel.

9. A process of stabilizing liquid hydrocyanic acid which consists in storing it in a nickel container.

10. A process of stabilizing liquid hydrocyanic acid which consists in contacting it with sulphuric acid and storing it in a vessel wherein nickel forms an integral part of the inner walls.

11. A process of stabilizing liquid hydrocyanic acid which consists in contacting it with sulphuric acid and storing it in a nickel container.

Signed at El Monte, in the county of Los Angeles and State of California, this 21st day of July A. D. 1925.

MARK WALKER.